(12) United States Patent
Kapolka

(10) Patent No.: US 7,084,735 B2
(45) Date of Patent: Aug. 1, 2006

(54) REMOTE VEHICLE SECURITY SYSTEM

(75) Inventor: Michael Kapolka, Sterling Heights, MI (US)

(73) Assignee: IDSC Holdings, LLC., Kenosha, WI (US)

(*) Notice: Subject to any disclaimer, the term of this patent is extended or adjusted under 35 U.S.C. 154(b) by 244 days.

(21) Appl. No.: 10/229,757

(22) Filed: Aug. 28, 2002

(65) Prior Publication Data

US 2004/0041691 A1 Mar. 4, 2004

(51) Int. Cl.
G05B 19/00 (2006.01)
G06F 7/00 (2006.01)
G08B 29/00 (2006.01)
H04B 1/00 (2006.01)
H04Q 9/00 (2006.01)

(52) U.S. Cl. ............... 340/5.5; 340/5.64; 340/466

(58) Field of Classification Search ............. 340/5.5, 340/825.69, 825.72, 825.22, 5.64, 463, 464–467, 340/905, 932, 396; 307/10.3, 10.5; 701/29, 701/35, 93, 97
See application file for complete search history.

(56) References Cited

U.S. PATENT DOCUMENTS

| | | | | |
|---|---|---|---|---|
| 5,023,599 A | * | 6/1991 | Mitchell et al. | 340/467 |
| 5,251,091 A | * | 10/1993 | Ito et al. | 361/152 |
| 5,429,089 A | * | 7/1995 | Thornberg et al. | 123/352 |
| 5,708,308 A | | 1/1998 | Katayama et al. | |
| 5,717,387 A | * | 2/1998 | Suman et al. | 701/36 |
| 5,798,575 A | * | 8/1998 | O'Farrell et al. | 307/10.1 |
| 5,803,043 A | | 9/1998 | Bayron et al. | 123/335 |
| 5,815,822 A | | 9/1998 | Iu | |
| 5,835,868 A | | 11/1998 | McElroy et al. | 701/2 |
| 5,839,534 A | * | 11/1998 | Chakraborty et al. | 180/169 |
| 5,852,330 A | * | 12/1998 | Yumoto | 290/40 R |
| 5,937,823 A | * | 8/1999 | Reeder et al. | 123/335 |
| 6,060,981 A | | 5/2000 | Landes | |
| 6,091,340 A | | 7/2000 | Lee et al. | |
| 6,157,317 A | | 12/2000 | Walker | 340/825.44 |
| 6,166,658 A | * | 12/2000 | Testa | 701/93 |
| 6,232,874 B1 | | 5/2001 | Murphy | |
| 6,246,948 B1 | * | 6/2001 | Thakker | 701/93 |
| 6,664,888 B1 | * | 12/2003 | Bishop | 340/426.11 |
| 6,876,914 B1 | * | 4/2005 | Dubois | 701/93 |

FOREIGN PATENT DOCUMENTS

| | | |
|---|---|---|
| EP | 0 681 951 A1 | 11/1995 |
| GB | 2 340 974 A | 3/2000 |
| WO | WO 01/38145 A1 | 5/2001 |

OTHER PUBLICATIONS

International Search Report for International Application No. PCT/US03/26503 (5 sheets).
International Search Report for International Application No. PCT/US03/26503.

* cited by examiner

Primary Examiner—Michael Horabik
Assistant Examiner—Nam Nguyen
(74) Attorney, Agent, or Firm—McDonnell Boehnen Hulbert & Berghoff LLP (57) ABSTRACT

A system and method for selectively limiting at least one operational characteristic, such as maximum speed, of a vehicle. A vehicle limitation control signal is supplied to the vehicle over a wireless communication network. In response to the limitation control signal, the maximum speed of the vehicle is limited.

33 Claims, 7 Drawing Sheets

REMOTE VEHICLE SECURITY SYSTEM

TECHNICAL FIELD OF THE INVENTION

The present invention relates generally to the field of selectively limiting one or more operational performance characteristics of a vehicle.

BACKGROUND OF THE INVENTION

An owner or operator of a vehicle may desire to limit the operational performance of his/her vehicle for many reasons. For example, in the event of a security breach, such as a car-jacking or other similar circumstance, the owner or operator of his/her vehicle may find it desirable to be able to cause the vehicle to enter a limited operational mode whereby the operational performance characteristics, such as maximum speed, is limited. In this way, certain security breaches in an automobile may be averted or, at least, the resulting negative effects minimized. The desirability of being able to limit the operational performance of a vehicle is even more acute for an owner of a fleet of commercial vehicles, such as commercial trucks and the like, which are very expensive and commonly carry expensive and/or hazardous cargo, and which are normally driven by employees.

SUMMARY OF THE INVENTION

The present invention relates to a new system and related method for limiting the operational performance of a vehicle. In one embodiment of the invention, one or more operational performance characteristic, such as maximum vehicle speed, of the vehicle can be selectively limited in response to a remotely-issued vehicle limitation control signal communicated to the vehicle over a wireless communication network. The vehicle includes a device for receiving the control signal, and, based thereon, limiting a performance characteristic of the vehicle. A variety of systems and methods are employed to limit the speed of the vehicle in response to the vehicle limitation control signal

DETAILED DESCRIPTION OF AN EMBODIMENT

Figure 1:
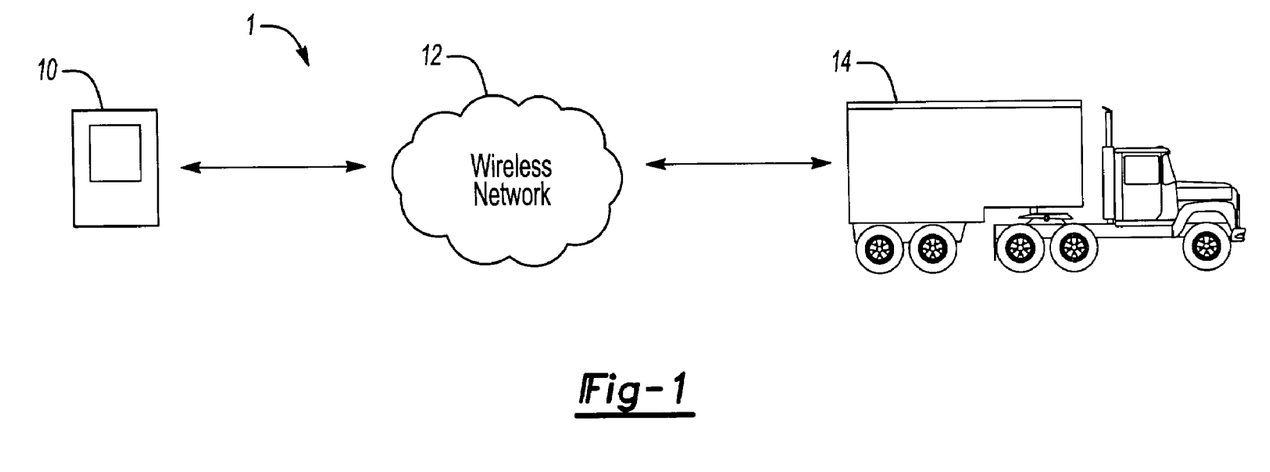
FIG. 1 illustrates an exemplary environment in which the present invention can be implemented.

The present invention relates to limiting one or more performance characteristics of a vehicle, such as maximum vehicle speed, in response to a vehicle limitation control signal. FIG. 1 illustrates an exemplary environment in which the described embodiment of the invention can be implemented. The environment 1 includes a command device 10 configured to issue a vehicle limitation control signal indicative of a desire of a human operator of the command device to limit one or more performance characteristics of a vehicle 14. The command device 10 can comprise many different known electronic devices, such as a personal computer, a personal digital assistant (PDA), a wireless phone, a pager, or a variety of other electronics capable of creating a control signal. The control signal is indicative of a desire to cause the vehicle 14 to enter a vehicle limitation mode, whereby its maximum speed (or other performance characteristic) is limited. The vehicle limitation control signal may preferably be generated remote from the vehicle 14 and communicated to the vehicle 14 over a wireless communication network 12. The wireless communication network 12 can comprise any one of a variety of known wireless communication networks that is capable of transmitting signals from a source device to a destination device in a wireless fashion. In addition to the features illustrated in FIG. 1, other components could be included in the environment 1 as well. For example, the command device 10 could be connected to a local area network (LAN) or wide area network (WAN), such as the Internet, and control signals issued by the command device 10 could be transmitted first through such a LAN or WAN and then through the wireless communication network 12 to the vehicle 14. Other variations of this environment are also contemplated to be within the scope of the present invention.

Though not illustrated in FIG. 1, it is contemplated that the vehicle limitation control signal that initiates the limited performance mode of the vehicle can also be generated locally from within the vehicle. For example, it is contemplated that a local command device, such as a switch or button, could be installed inside of the vehicle so that a vehicle operator could initiate the limited performance mode on the vehicle. It is further contemplated that, depending on the particular embodiment of the invention, the limited performance mode could be activated by: (i) a remotely-issued control signal only (as illustrated in FIG. 1); (ii) a locally-issued control signal only (as described above); or (iii) either a remotely-issued control signal or a locally-issued control signal. A remotely-issued control signal can be initiated by, for example, a manager of a commercial fleet of vehicles, whereas a locally-issued control signal can be issued by the driver.

When a particular embodiment of the invention includes the ability to remotely-issue the control signal, the vehicle 14 is configured with a signal-receiving device mounted thereon, which is capable of receiving a wirelessly-transmitted control signal. The signal-receiving device will typically include an antenna and receiver for receiving the control signal and, possibly, a means for storing, modifying, adjusting or otherwise causing the received control signal to be converted into a format that is usable by the system to limit one or more operational performance characteristics of the vehicle. Various signal-receiving devices are known to those of skill in the art. One example of a known signal-receiving device is commercially-available from the assignee hereof under the trademark, PRISM.™ Other signal-receiving devices can also be used in connection with the invention.

Figure 2:
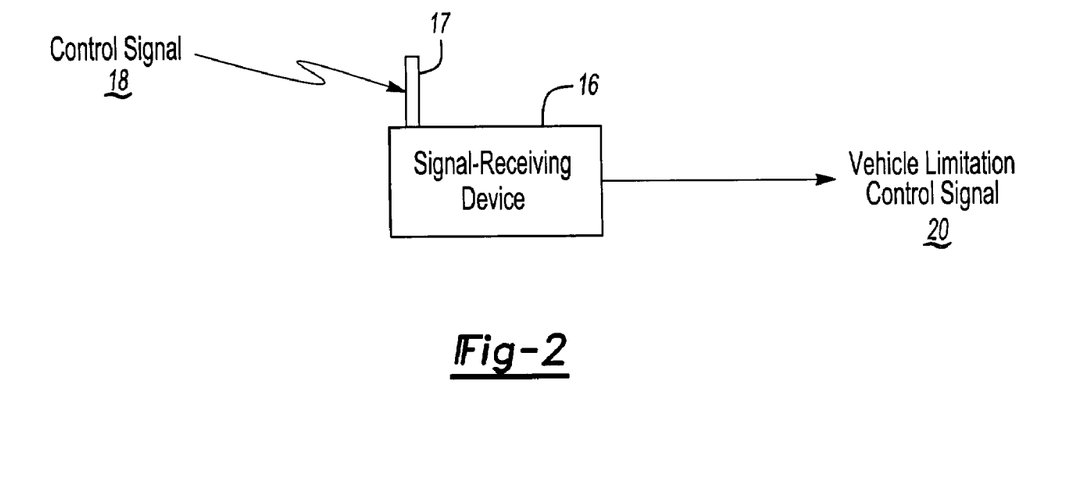
FIG. 2 illustrates an exemplary command device according to an embodiment of the invention.

FIG. 2 sets forth an illustrative signal-receiving device 16, which could be mounted to the vehicle 14. The signal-receiving device may receive the vehicle limitation control signal 18 (from the remotely-located command device 10) via antenna 17. Though not shown in FIG. 2, the signal-receiving device may also (or alternatively) receive a vehicle limitation control signal from a command device locally-mounted to or in the vehicle 14 and operable by the driver of the vehicle. When the signal-receiving device 16 relays a vehicle limitation control signal (either from a remote or local command device), the signal-receiving device 16 provides a vehicle limitation signal 20. The signal-receiving device 16 may be configured to modify or otherwise adjust the nature of the received control signal 18, when generating the vehicle limitation signal, into any useable format. Further, in the event that the embodiment of the invention includes a locally-mounted command device only (i.e., not configured to receive remotely-issued control signals), the locally-mounted command device may supply the vehicle limitation signal 20 directly. Further, a vehicle limitation signal 20 may be automatically activated for various other reasons, such as if the vehicle 14 loses communication with the command device 10.

The signal-receiving device 16 provides the vehicle limitation control signal 20 to a control circuit or control module in order to limit one or more operational performance characteristics of the vehicle 14. Various systems and methods can be used to limit operational performance characteristics of a vehicle. Exemplary systems and methods for limiting the maximum speed of a vehicle are described hereinafter.

Figure 3:
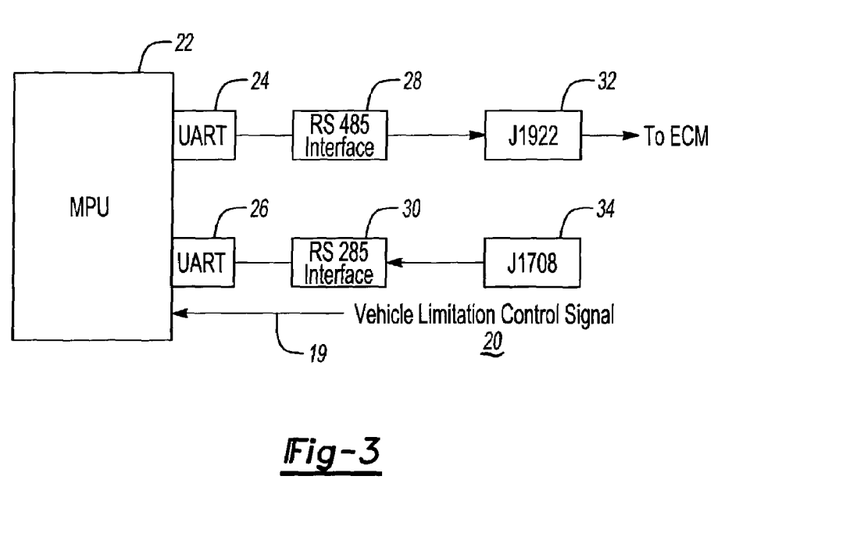
FIG. 3 illustrates a first exemplary embodiment of the invention.

A first exemplary system and method for limiting the maximum speed of a vehicle in response to a vehicle limitation signal 20 is set forth in FIG. 3. This exemplary system and method is particularly applicable to vehicles, such as heavy-duty trucks, that incorporate an SAE J1922 control link, defined by the Society of Automotive Engineers (SAE). Under this embodiment of the invention, the vehicle limitation control signal 20 is provided to a microprocessor unit (MPU) 22 (sometimes referred to herein as a "controller"). The vehicle limitation control signal 20 may be provided to the MPU 22 via a discrete input terminal 19 in the form of a binary electrical signal, i.e., either a "high" or "low" state, one of which states indicating a desire to limit the maximum vehicle speed. Alternatively, the vehicle limitation signal 20 may be provided to the MPU 22 via an SAE J1708 data bus 34, through an RS 285 interface 30 and a Universal Asynchronous Receiver/Transmitter (UART) device 26, in which case the vehicle limitation signal 20 would conform to SAE J1587 format. Other methods of supplying a vehicle limitation signal to the MPU may also be used. Regardless of the manner in which the vehicle limitation signal 20 is provided to the MPU 22, the vehicle limitation signal 20 causes the MPU 22 to initiate a vehicle limitation mode by issuing commands to the vehicle's Engine Control Module (ECM) over the SAE J1922 control link 32 via UART 24 and RS 485 interface 28.

The SAE J1922 control link standard defines a particular command code that can be issued over the J1922 control link to limit the engine speed and torque rating of the vehicle (referred to hereinafter as the "speed limit command code"). The speed limit command code should be transmitted to the J1922 control link at least every 250 ms for as long as the vehicle limitation mode is engaged. Accordingly, under this embodiment of the invention, the MPU 22, in response to receiving an activated vehicle limitation control signal 20, causes a speed limit command code to be issued over the J1922 control link at least every 250 ms while the vehicle limitation mode is engaged.

Figure 4:
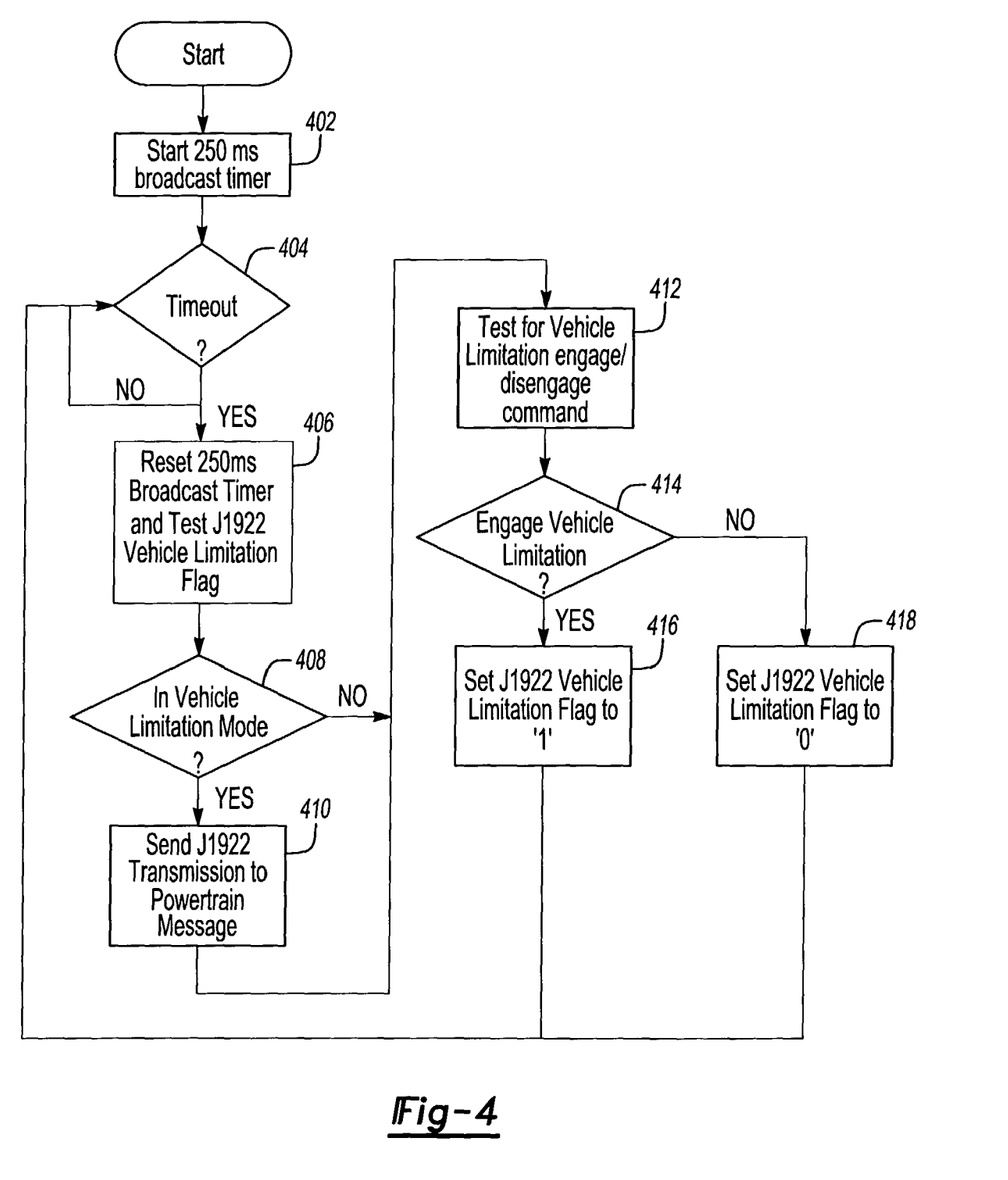
FIG. 4 sets forth a flowchart illustrating an exemplary algorithm that could be used to implement the first exemplary embodiment of the invention.

FIG. 4 illustrates an embodiment of an algorithm that can be used to control the transmission of speed limit command codes to the J1922 control link. Upon startup of the routine, a broadcast timer is started at block 402. Because the J1922 standard recites that a speed limit command code be transmitted at least every 250 ms to maintain a maximum vehicle speed in place, the broadcast timer is preferably a 250 ms broadcast timer. At block 404, the broadcast timer is queried to determine if a timeout has occurred. The broadcast timer is continuously monitored to determine when a timeout has occurred. When a timeout occurs, the broadcast timer is reset and a J1922 vehicle limitation flag is tested at block 406. The J1922 vehicle limitation flag is preferably a binary indicator that stores whether or not the vehicle is in limitation mode. If the vehicle limitation flag is "1" (indicating that the MPU 22 has received an active vehicle limitation signal 20), then the MPU 22 transmits a speed limit command code over the J1922 control link (shown in block 410). If the vehicle limitation flag is "0" (indicating that the MPU has not received an active vehicle limitation signal 20), then the MPU 22 does not transmit a speed limit command code. In either event, the MPU 22 next queries the vehicle limitation signal 20, as shown in blocks 412 and 414. If the vehicle limitation signal 20 indicates that the vehicle should be in a vehicle limitation mode, then the vehicle limitation flag is set to "1", as shown in block 416. If the vehicle limitation control signal 20 does not indicate that the vehicle should be in a vehicle limitation mode, then the vehicle limitation flag is set to "0", as shown in block 418. Then, control of the algorithm is looped back to block 404, where the broadcast timer is again continuously queried until a timeout occurs, and the routine is repeated. In this way, whenever the vehicle limitation flag is set (resulting from the receipt of an active vehicle limitation control signal 20, either over the input line 19 or the J1708 data bus 34), the MPU 22 transmits the speed limit command code over the J1922 control link to the ECM once every 250 ms, which limits the maximum speed of the vehicle. Preferably, the above-described routine is implemented in software or hardware in the MPU 22.

Figure 5:
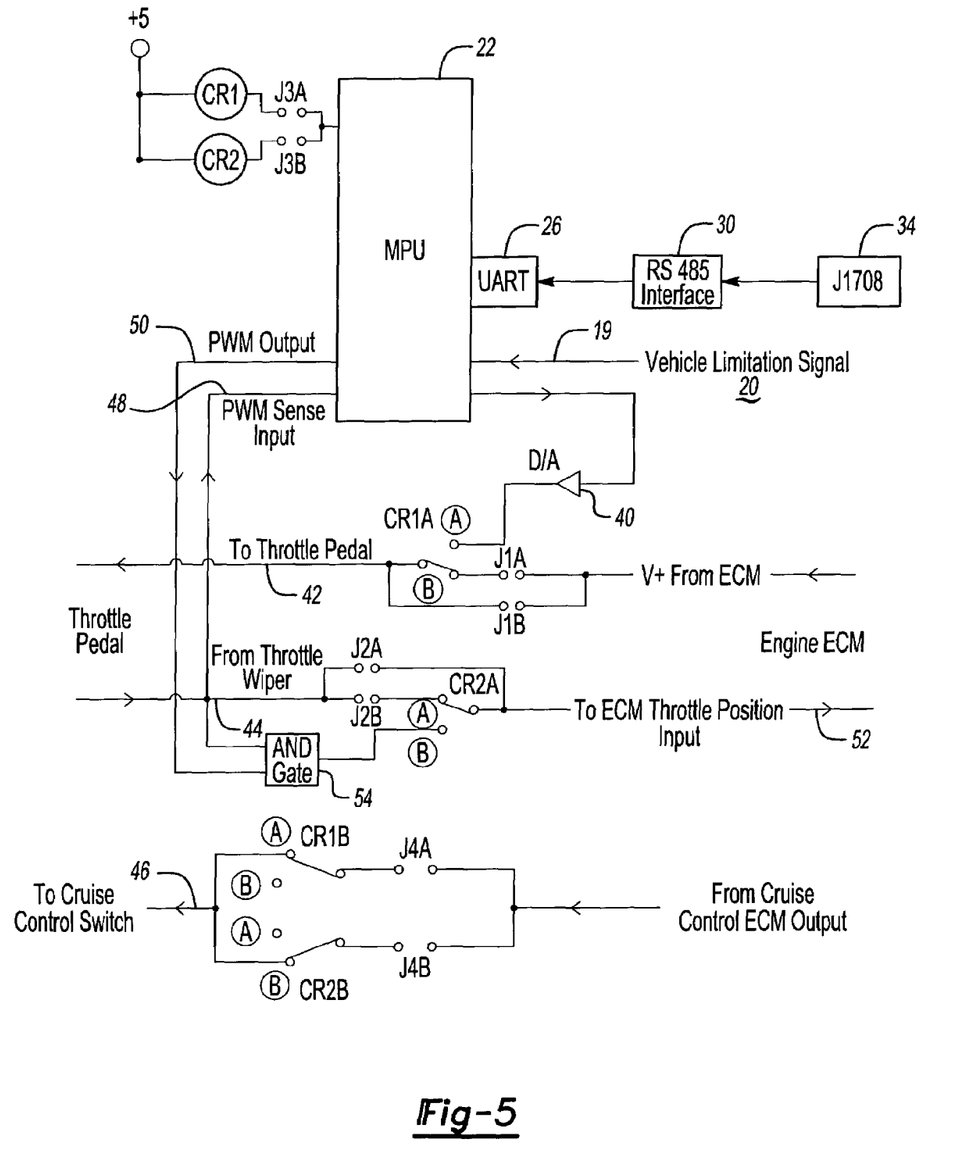
FIG. 5 illustrates a second exemplary embodiment of the invention.

FIG. 5 illustrates a second exemplary embodiment of a system and method that can be used for limiting the maximum speed of a vehicle in response to a vehicle limitation control signal 20. Components in FIG. 5 that are the same as those in FIG. 3 bear the same reference numerals. As in the first exemplary embodiment, the vehicle limitation control signal 20 can be provided to the MPU 22 either through a discrete signal input 19 or across the J1708 data bus 34. In response to receiving a vehicle limitation control signal 20 indicative of a desire to limit the performance characteristics of the vehicle 14, the MPU 22 limits the output of the vehicle's electronic throttle pedal (not shown), which is provided to the vehicle's ECM. The present embodiment assumes that the vehicle employs one of two possible electronic throttles that are known in the art: (i) a resistive throttle; or (ii) a pulse-width modulated throttle. As one skilled in the art will understand, a resistive throttle generally involves adjusting a variable resistance between a constant application voltage in response to an operator command, such as an adjustment of an accelerator pedal. The voltage drop across the variable resistance determines the throttle output and thus the vehicle speed. As one skilled in the art will further understand, a pulse-width modulated throttle is configured to produce a pulse-width modulated signal (i.e., a "pulse train") to the vehicle's ECM, wherein the width and frequency of the pulses are indicative of the desired vehicle speed.

FIG. 5 illustrates four sets of jumpers J1(A&B), J2(A&B), J3(A&B), and J4(A&B), which allow a single physical implementation of this embodiment of the invention to be used with a wide variety of vehicles, regardless of whether they have a resistive throttle or a pulse-width modulated throttle. If the vehicle uses a resistive throttle, then jumpers J1A, J2A, J3A, and J4A are connected, and if the vehicle uses a pulse-width modulated throttle, then jumpers J1B, J2B, J3B, and J4B are connected. It is also within the scope of this invention to implement a physical embodiment that can be used with either a resistive throttle or a pulse-width modulated throttle, but not both, in which case jumpers J1, J2, J3, and J4 could be eliminated. For purposes of description, it is first assumed that the presently-described embodiment of the invention is installed on a vehicle that uses a resistive throttle, and that, accordingly, jumpers J1A, J2A, J3A, and J4A are connected. During normal operation, relay CR1A is in the "B" position and CR1B is in the "A" position. The normal position of relay CR1A allows the vehicle's Engine Control Module (ECM) to provide a constant voltage (V+) through jumper J1A over line 42 to the vehicle's throttle pedal (not shown). Usually, the constant voltage is nominally 5 volts. Further, the normal position of relay CR1B allows the ECM to respond to the driver's engagement of the vehicle's cruise control on/off switch. In response to movement of the vehicle's accelerator pedal (not shown), the variable resistance of the throttle position sensor coupled between the V+ voltage and ground is adjusted, which, in turn, adjusts the voltage drop across the variable resistance. The voltage drop across the variable resistance controls the output of the throttle position sensor, which is provided over line 44 through jumper J2A to the vehicle's ECM. The ECM uses the throttle position sensor output to control the vehicle's RPM level and thus the vehicle speed.

When the vehicle limitation control signal 20 is activated (or an appropriate signal is received over the J1708 data bus), the MPU 22 establishes a V+ output on the D/A converter 40 identical to that supplied from the ECM. The MPU 22 activates relay CR1 (A&B) such that CR1A moves from position "B" to position "A" and CR1B moves from position "A" to position "B". The activation of relay CR1 simultaneously disengages the vehicle's cruise control enable switch and switches the input to the throttle position sensor (not shown) over line 42 from the constant V+ supplied by the ECM to the V+ output on the D/A converter 40. Then, the MPU 22 gradually decreases the V+ voltage of the D/A converter 40 to a lower voltage corresponding to the maximum engine RPM allowed to produce the desired maximum speed of the vehicle. As the voltage from the D/A converter 40 is reduced, so is the maximum output from the throttle position sensor supplied to the vehicle's ECM over line 44. Generally, a 1.2 volt output from the D/A converter 40 will impose a limit of 1200 RPM on the engine. As long as the reference voltage supplied to the throttle position sensor is limited, the maximum speed of the vehicle will be limited because the maximum output from the throttle position sensor (supplied to the ECM) directly corresponds to the reference voltage supplied to the throttle position sensor. Though the maximum speed of the vehicle is limited, it is still possible for the driver to completely control the speed of the vehicle in a normal fashion at any level up to the limited speed.

Now, it is assumed that the presently-described embodiment of the invention is installed on a vehicle having a pulse-width modulated throttle. Accordingly, jumpers J1B, J2B, J3B, and J4B are connected. During normal operation, relay CR2 is deactivated such that CR2A is in the "A" position and CR2B is in the "B" position. As a result, the throttle position sensor can provide a train of pulses (sometimes referred to herein as the "primary pulse train") over line 44 through jumper J2B to the vehicle's ECM. Normally, the width of the pulses is determined solely by the position of the vehicle's accelerator pedal. Further, if requested by the vehicle operator, the ECM can issue a signal through J4B and line 46 to the vehicle's cruise control switch to turn the vehicle's cruise control function on, if desired by the driver.

When the MPU 22 receives a vehicle limitation signal 20 (or appropriate J1708 message), the MPU 22 sets the PWM output line 50 "high" and then activates relay CR2, which causes CR2A to move to position "B" and CR2B to move to position "A". The activation of CR2A causes the ECM to receive its throttle input on line 52 through the "AND" gate 54. The activation of CR2B disengages the cruise control engage switch. At this point, with the signal on line 50 being held "high", the pulse train from the throttle position sensor is allowed to simply pass through to the ECM. To limit the vehicle's RPM and speed, the MPU 22 samples the pulse train from the throttle position sensor on its PWM sense input line 48, and, using an internal timer, establishes a matching pulse train, having an identical duty cycle and pulse width. The matching pulse train is supplied by the MPU 22 on the PWM output line 50 to the "AND" gate 54 (sometimes referred to herein as the "secondary pulse train"). Again, while the pulse train supplied by the vehicle's throttle position sensor and the pulse train supplied by the MPU mirror each other, the input to the ECM over line 52 will be the same as the pulse train generated by the throttle position sensor, thus making the vehicle appear to operate normally to the driver. To limit the vehicle's speed, the MPU 22 gradually reduces the width of the pulses that it generates on the PWM output line 50 and provides to the "AND" gate 54. Since the output of the "AND" gate is "high" only when both inputs are "high", the shorter pulses generated by the MPU will limit the width of the pulses supplied to the ECM on line 52 (sometimes referred to herein as a "limited pulse train"). The MPU gradually decreases the width of the pulses output on line 50 to a level that corresponds to the maximum desired vehicle RPM. As long as relay CR2A is in position "B" and the width of the pulses supplied by the MPU 22 is limited, the maximum speed of the vehicle will be limited.

Figure 6:
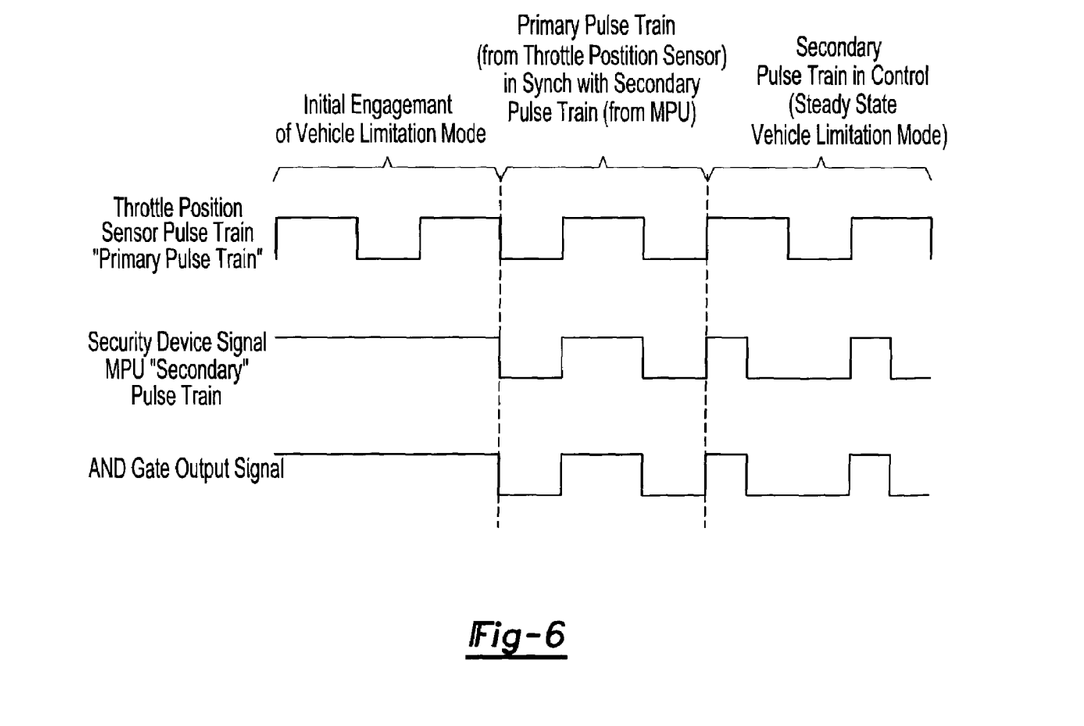
FIG. 6 illustrates an exemplary primary pulse train produced by a throttle position sensor and an exemplary secondary pulse train produced by an MPU, according to an embodiment of the invention.

FIG. 6 illustrates an exemplary primary pulse train supplied by the vehicle's throttle position sensor and a corresponding secondary pulse train supplied by the MPU 22. A third pulse train is also depicted in FIG. 6, which illustrates an exemplary output pulse train from the AND gate 54. The first portion (from left to right) of FIG. 6 illustrates a time when the vehicle limitation mode is first engaged and the PWM output line 50 is set to "high" such that the primary pulse train remains in control of the throttle input signal to the vehicle's ECM. The middle portion of FIG. 6 illustrates a time when the MPU 22 creates a secondary pulse train on the PWM output line 50 that mirrors the primary pulse train. The third portion of FIG. 6 illustrates a time when the MPU 22 reduces the width of the pulses making up the secondary pulse train such that the secondary pulse train controls the throttle input signal (output of the AND gate 54) to the vehicle's ECM.

Figure 7:
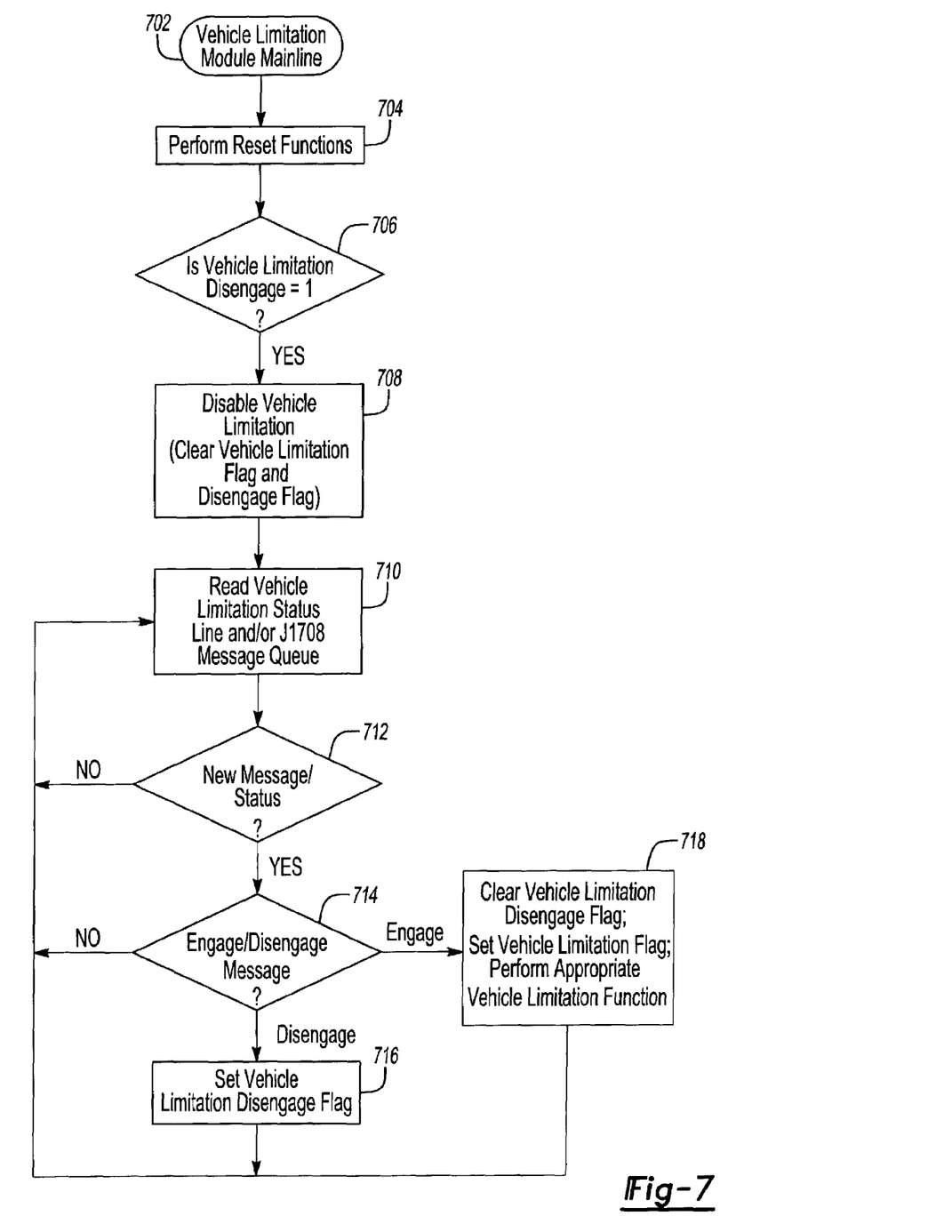
FIG. 7 sets forth a flow chart that illustrates an exemplary algorithm that could be used to implement the second exemplary embodiment of the invention.
Figure 8:
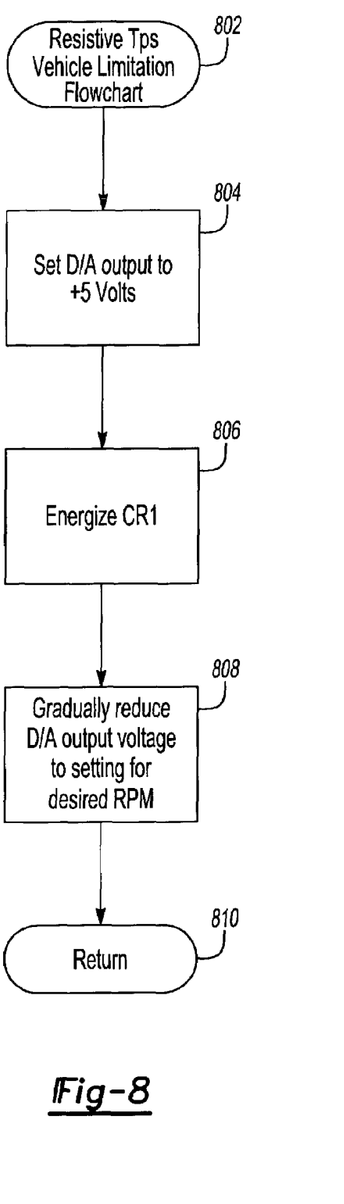
FIG. 8 sets forth a flow chart that illustrates an exemplary algorithm that could be used to implement the second exemplary embodiment of the invention.
Figure 9:
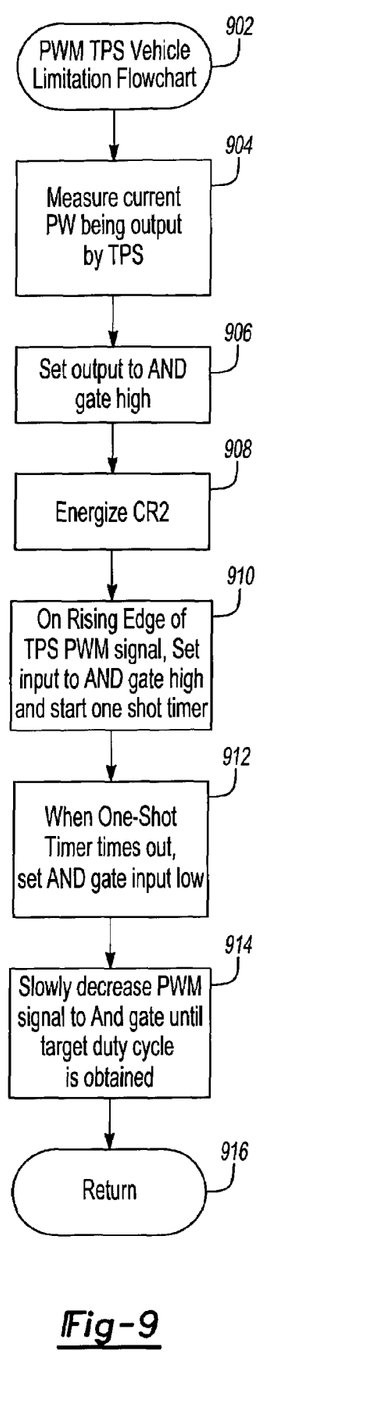
FIG. 9 sets forth a flow chart that illustrates an exemplary algorithm that could be used to implement the second exemplary embodiment of the invention.

FIGS. 7–9 set forth flowcharts of exemplary algorithms that can be employed by the MPU 22 to implement the above-described embodiment of the invention. FIG. 7 illustrates an exemplary mainline algorithm for controlling the MPU 22. The mainline algorithm begins at block 702. As shown in block 704, upon power-up, the MPU 22 performs any appropriate reset functions. At block 706, the MPU 22 queries a non-volatile memory location to determine if a vehicle limitation disengage flag is set to "1". The vehicle limitation disengage flag is stored in non-volatile memory so that the vehicle limitation mode cannot be reset merely by turning the vehicle off and restarting it. If the vehicle limitation disengage flag is set to "1", the vehicle limitation mode is disengaged by clearing the vehicle limitation flag and a disengage flag, shown at block 708. Next, shown at block 710, the MPU 22 reads the vehicle limitation signal line 19 and/or the J1708 data bus, depending upon the method used to supply the vehicle limitation signal 20 to the MPU 22. Then the MPU 22 determines if a vehicle limitation control signal 20 has been provided, as shown at block 712. If so, at block 714 the MPU 22 determines if the vehicle limitation control signal is indicative of a disengage message or an engage message. If the message is indicative of an engage command, the MPU 22, at block 718, clears the vehicle limitation disengage flag, sets the vehicle limitation flag and performs the appropriate vehicle limitation function (as described in more detail hereinafter), depending upon whether the vehicle uses a resistive throttle position sensor or a pulse-width-modulated throttle position sensor. If the message is indicative of a disengage command, the MPU 22, at block 716, sets the vehicle limitation disengage flag. Regardless of the nature of the message, control of the algorithm is then transferred back to block 710, where the MPU 22 again queries the vehicle limitation signal line 19 or the J1708 data bus 34, as the case may be.

As can be appreciated from reviewing FIG. 7, this embodiment of the invention preferably allows the vehicle limitation mode be disengaged upon the MPU receiving a disengage signal over line 19 or the J1708 data bus and upon the vehicle being turned off and restarted. That is, once a vehicle limitation mode is engaged, it can only be disengaged after the vehicle has been turned off and restarted. This feature, though not necessary to accomplish the basic goal of limiting the performance of the vehicle, is an optional safety feature. When the vehicle is in vehicle limitation mode, it is probable that the driver will be holding the accelerator in its maximum position. If the vehicle limitation mode were to be abruptly disengaged while the driver was holding the accelerator in its maximum position, the driver could conceivably lose control the vehicle as a result of the abrupt change in speed of the vehicle. Accordingly, this particular embodiment of the invention requires that the vehicle be turned off and restarted before disengaging the vehicle limitation mode.

FIG. 8 illustrates a flowchart of an exemplary algorithm that could be used to implement the vehicle limitation mode on a vehicle that uses a resistive throttle position sensor. The algorithm shown in FIG. 8 would be called from block 718 of FIG. 7. The resistive vehicle limitation algorithm begins at block 802. At block 804, the MPU 22 sets the output of the D/A 40 to V+ volts to match the V+ volts normally provided to the variable resistance of the throttle position sensor by the ECM. As indicated above, V+ is typically a nominal 5 volts. At block 806, the MPU 22 energizes relay CR1, which, as described above, disengages the vehicle's cruise control and connects the throttle pedal to the output of the D/A converter 40 instead of the V+reference voltage provided from the ECM. Then, at block 808, the MPU 22 gradually reduces the output of the D/A converter 40 to a level corresponding to a desired maximum engine RPM. Then, at block 810, control is returned to the mainline algorithm illustrated in FIG. 7.

FIG. 9 illustrates an exemplary algorithm that could be used to implement the vehicle limitation mode on a vehicle that uses a pulse-width-modulated throttle position sensor. As above, the algorithm set forth in FIG. 9 would be called from block 718 of the mainline algorithm illustrated in FIG. 7. The pulse-width modulation vehicle limitation algorithm starts at block 902. At block 904, the pulse train currently being supplied to the ECM by the throttle position sensor over line 44 is sampled at PWM sense input 48. This is done so that the MPU 22 can initially emulate the pulse train currently being supplied from the throttle position sensor to the ECM. At block 906, the MPU 22 sets the PWM output line 50 to "high" so that the output of "AND" gate 54 will simply reflect the pulse train currently being supplied from the throttle position sensor to the ECM. At block 908, the MPU 22 energizes relay CR2, which, as described above, disengages the vehicle's cruise control and switches the signal received by the ECM throttle position input to be the output of the "AND" gate 54. At blocks 910 and 912, the MPU causes the signal output on PWM output line 50 to emulate the pulse train received on PWM sense input 48. As a result, the two inputs to the "AND" gate 54 are identical. Then, at block 914, the MPU 22 causes the width of the pulses generated by the MPU 22 on PWM output line 50 to slowly get shorter until a target pulse width is attained that corresponds to a maximum desired engine RPM. After the target pulse width is attained on PWM output line 50, control is returned (at block 916) to the mainline algorithm illustrated in FIG. 7.

One skilled in the art will recognize, in light of this disclosure, that it is desirable to incorporate multiple systems and methods for limiting the speed of the vehicle into a single physical module. In this way, a single module can be used on a variety of vehicles that have different capabilities and different throttle position sensors. Depending on the features needed, the communication capabilities of the vehicle, and the type of equipment (including throttle position sensor) already present on the vehicle, an installer of the module can customize the module on-site by connecting different jumpers.

Figure 10:
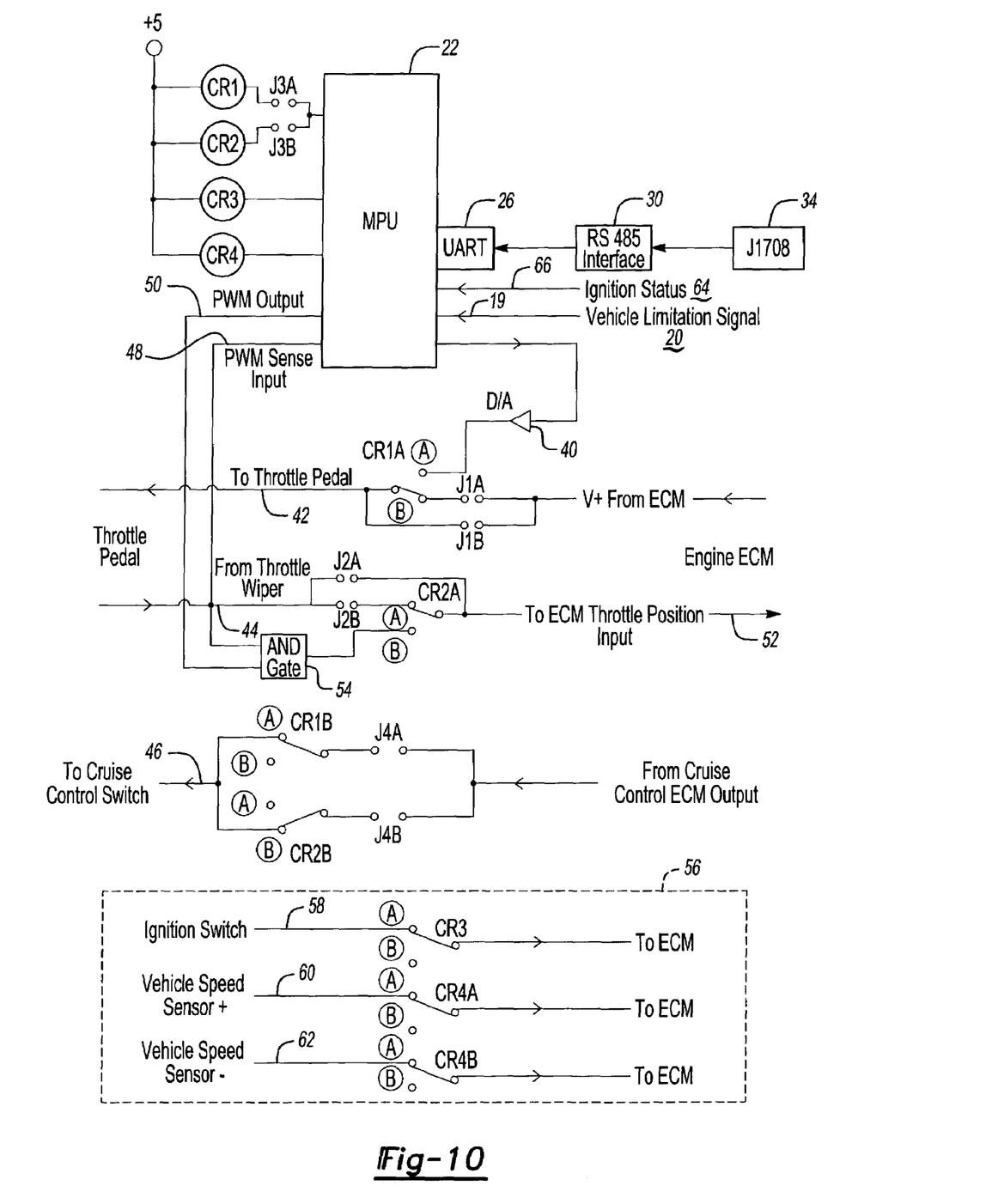
FIG. 10 illustrates additional features that could be used in connection with an embodiment of the invention.

FIG. 10 illustrates an embodiment of the present invention having additional features above and beyond those shown in FIG. 5. The components of FIG. 5 that are common to the embodiment of the invention illustrated in FIG. 10 have identical reference numerals. New to the embodiment illustrated in FIG. 10 are two new external relays CR3 and CR4 and related circuitry 56. In this embodiment of the invention, relay CR3 is installed in the signal line 58 between the vehicle's ignition switch and the ECM. With relay CR3 in place, the MPU 22, in response to the receipt of an active vehicle limitation signal 20 (from either the vehicle limitation input 19 or the J1708 data bus 34), can activate CR3, thereby switching CR3 from its normal "A" position to its "B" position. When relay CR3 is in the "B" position, the signal line between the vehicle's ignition switch and the vehicle's ECM is broken, thus shutting the vehicle down.

Further, FIG. 10 illustrates vehicle speed sensor+line 60 and vehicle speed sensor—line 62, which connect the vehicle's speed sensor to the vehicle's ECM. According to this embodiment of the invention, relays CR4A and CR4B are inserted into the signal lines 60 and 62. When the MPU 22 receives an active vehicle limitation control signal 20, it activates relay CR4, which breaks the connection between the vehicle's speed sensor and the vehicle's ECM. In certain known engines, such as the Cummins ISx series engines and certain Mack engines, the vehicle's ECM automatically imposes a maximum engine RPM when the vehicle's speed sensor no longer provides a speed sensor signal to the ECM. By breaking the connection between the vehicle's speed sensor and the vehicle's ECM by switching relay CR4 from its "A" position to its "B" position, the ECM on these engines will automatically limit the engine RPM output to a relatively low maximum level.

The additional relays CR3 and CR4 and the additional control circuitry 56 shown in FIG. 10, when desired, can be implemented in connection with or separate from the other features of the embodiment shown in FIG. 10. For example, in some applications, the use of relay CR4 to break the signal line between the vehicle's speed sensor and the vehicle's ECM may allow for sufficient control of the vehicle, thereby eliminating the desire to incorporate the throttle control methods described above in connection with FIGS. 8 and 9. Similarly, the inclusion of relay CR3 may or may not be desirable, depending on the situation.

It is contemplated that the various systems and methods described herein for limiting the operational performance characteristics of the vehicle in response to a control signal—such as that described in connection with FIGS. 3 and 4, or that described in connection with FIGS. 5–9, or that described in connection with FIG. 10—can be selectively used together or alone to implement the present invention. It is further contemplated that various aspects of the above-described embodiments can be physically incorporated into other communication and control modules that may already exist on vehicles.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements. The invention is limited by the following claims.

The invention claimed is:

1. A system for limiting performance of a vehicle, comprising:
   a first controller located aboard said vehicle and configured to control, in accordance with a stimulus originating from a location local to the vehicle, to a first operational performance characteristic;
   a command device located remotely from the vehicle and configured to send a control signal via a wireless communication network;
   a receiving device located aboard said vehicle and configured to receive said control signal; and
   a second controller located aboard the vehicle and configured to limit, in response to said control signal, said control of said vehicle to a second operational performance characteristic when said stimulus indicates to said first controller to control said vehicle to the first operational performance characteristic;
   wherein said second controller is further configured to (i) transmit to said first controller, responsive to said control signal, a vehicle limitation command message to place said vehicle in a vehicle limitation mode, and (ii) cause a vehicle limitation flag to be stored in non-volatile memory, and wherein said vehicle limitation flag is indicative of maintaining said vehicle in said vehicle limitation mode.

2. The system of claim 1, wherein said first operational performance characteristic is a first speed of said vehicle, and wherein said second operational performance characteristic is a second speed of said vehicle, and wherein said second speed is less than said first speed.

3. The system of claim 1, wherein said command device comprises a device selected from a group of devices consisting of (i) a computer; (ii) a personal digital assistant; (iii) a wireless telephone; and (iv) a pager.

4. The system of claim 1, wherein said second controller is configured to receive said control signal via an SAE J1708 data link.

5. The system of claim 1, wherein said first controller is an electronic-control module (ECM) of said vehicle, and wherein the second controller is configured to transmit, responsive to said control signal, a vehicle limitation command message to the ECM via an SAE J1922 data link.

6. The system of claim 5, wherein said second controller is configured to transmit said vehicle limitation command message at least once every 250 ms.

7. The system of claim 1, wherein the first controller is an electronic-control module; and wherein said second controller is configured to adjust, responsive to said control signal, a throttle position sensor signal supplied to said electronic control module.

8. The system of claim 7, wherein said vehicle employs a resistive throttle position sensor (resistive-throttle-position sensor), wherein the resistive-throttle-position sensor is operable to provide to said electronic control module an output signal, wherein said output signal is as a function of a reference voltage supplied to said resistive throttle position sensor, and wherein said reference voltage has a maximum value, and wherein said second controller is configured to cause a reduction in said maximum value of said reference voltage, and in turn, a reduction in said output signal.

9. The system of claim 7, wherein said vehicle employs a pulse-width-modulated throttle position sensor (PWM-throttle-position sensor), wherein, responsive to said stimulus, said PWM-throttle-position sensor provides to said electronic control module a first pulse having a first duration, wherein said second controller is configured to cause, responsive to said control signal, a second pulse to be provided to said electronic control module, wherein said second pulse has a second duration, and wherein said second duration is shorter than said first duration.

10. The system of claim 7, wherein said vehicle employs a pulse-width-modulated throttle position sensor (PWM-throttle-position sensor), wherein, responsive to said stimulus, said PWM-throttle-position sensor provides a first pulse having a first duration, wherein, responsive to said control signal, said second controller provides a second pulse having a second duration, wherein said second duration is shorter than the first duration, and further comprising a comparator device configured to obtain said first and second pulses and responsively provide to the electronic control module a third pulse having a third duration, wherein the third duration is a (i) function of said second and third durations and (ii) shorter than the first duration.

11. The system of claim 10, wherein said comparator device is an AND gate.

12. The system of claim 1, wherein said second controller is further configured to cause a cruise control switch of said vehicle to be disabled.

13. The system of claim 1, wherein said second controller is further configured to cause, in response to said control signal, disconnection of a vehicle speed sensor located aboard said vehicle so as to limit said control of said vehicle.

14. The system of claim 1, wherein said second controller is further configured to cause a disconnection of an ignition switch aboard said vehicle.

15. The system of claim 1, wherein said second controller is further configured to (a) transmit a vehicle limitation command via an SAE J1922 data link to place said vehicle in a vehicle limitation mode; and (b) adjust a throttle position sensor signal supplied to an electronic control module of said vehicle, and wherein the second controller is further configured to select, in response to said control signal, (a), (b), (a) and (b), or (a) or (b).

16. The system of claim 15, wherein said vehicle employs a resistive throttle position sensor, and said second controller is configured to adjust said throttle position sensor signal by causing a reference voltage supplied to said throttle position sensor to be reduced such that said output of said throttle position sensor is reduced.

17. The system of claim 15, wherein said vehicle employs a pulse-width-modulated throttle position sensor, and said second controller is configured to adjust a throttle position sensor signal supplied to said electronic control module by causing a width of pulses supplied to said electronic control module to be reduced.

18. The system of claim 1, further comprising a means for locally issuing from within said vehicle to said second controller said control signal.

19. The system of claim 1, wherein the first controller and the second controller are the same controller.

20. A method for limiting a performance characteristic of a vehicle, comprising:
receiving a stimulus for causing said vehicle to attain a maximum speed, wherein said stimulus originates from a location local to said vehicle;
receiving via a wireless communication network a vehicle limitation control signal; and
responsive to said vehicle limitation control signal, limiting said vehicle to an operational speed despite said stimulus for causing the vehicle to attain a maximum speed, wherein said operational speed is slower than said maximum speed;
wherein limiting said vehicle to an operational speed comprises providing to a throttle position sensor a limiting reference voltage, wherein said limiting reference voltage is less than a primary reference voltage, and wherein said primary reference voltage is operable to allow said vehicle to attain said maximum speed.

21. The method of claim 20, wherein said vehicle limitation control signal is received via an SAE J1708 data bus.

22. The method of claim 20, wherein limiting said vehicle to said operational speed comprises providing a limiting pulse to an electronic-control module (ECM) of the vehicle, wherein said limiting pulse is shorter in duration than a primary pulse provided to said ECM from said throttle position sensor, and wherein the primary pulse is operable to allow said vehicle to attain said maximum speed.

23. The method of claim 20, wherein limiting said vehicle to said operational speed comprises transmitting a vehicle limitation command message via an SAE J1922 data link, and wherein said vehicle limitation command message is operable to place said vehicle in a vehicle limitation mode.

24. The method of claim 20, wherein limiting said vehicle to said operational speed comprises interrupting transmission of data emanating from a speed sensor.

25. The method of claim 20, wherein said vehicle comprises an electronic control module (ECM) and a throttle position sensor, and further comprising:
determining a characteristic of an output signal provided by said throttle position sensor;
providing a limiting reference voltage to said throttle position sensor when said characteristic is a function of a variable resistance, wherein said limiting reference voltage is less than a primary reference voltage, and wherein said primary reference voltage is operable to allow said vehicle attain said maximum speed; and
providing to said ECM a limiting pulse when said characteristic is a function of pulse-width control, wherein said limiting pulse is shorter in duration than a primary pulse provided to said ECM from said throttle position sensor, and wherein said primary pulse is operable to cause said vehicle to attain said maximum speed.

26. The method of claim 20, further comprising:
receiving a disengage control signal;
restarting the vehicle; and
responsive to (i) receiving the vehicle disengage control signal, and (ii) restarting the vehicle, ceasing to limit said operational characteristic of said vehicle.

27. The method of claim 20, wherein said vehicle further comprises an ignition switch, and further comprising selectively disconnecting said ignition switch.

28. A system for limiting performance of a vehicle, comprising:
a command device located remote from said vehicle and configured to send a control signal via a wireless communication network;
a receiving device located aboard said vehicle and configured to receive said control signal; and
a controller configured to (i) transmit, responsive to said control signal, a vehicle limitation command message to place said vehicle in a vehicle limitation mode, wherein said vehicle limitation command message is transmitted via an SAE J1922 data link to an electronic-control module of the vehicle, and (ii) cause a vehicle limitation flag to be stored in non-volatile memory, wherein said vehicle limitation flag is indicative of maintaining said vehicle in the vehicle limitation mode.

29. A system for limiting performance of a vehicle, wherein said vehicle comprises an electronic control module and a resistive throttle position sensor (resistive-throttle-position sensor), wherein the resistive-throttle-position sensor is operable to provide to said electronic control module an output signal, wherein said output signal is as a function of a reference voltage supplied to said resistive throttle position sensor, and wherein said reference voltage has a maximum value, said system comprising:
a command device (i) located remotely from said vehicle and (ii) configured to send a control signal via a wireless communication network;
a receiving device (i) located aboard said vehicle and (ii) configured to receive said control signal; and a controller configured to:
  transmit, responsive to said control signal, a vehicle limitation command message to said electronic control module ECM via and SAE J1922 data link; and
  reduce, responsive to said control signal, said reference voltage so as to reduce said output signal.

30. A system for limiting performance of a vehicle, said system comprising:
  a command device (i) located remotely from said vehicle and (ii) configured to send a control signal via a wireless communication network;
  a receiving device (i) located aboard said vehicle and (ii) configured to receive said control signal;
  a pulse-width-modulated throttle position sensor (PWM-throttle-position sensor) configured to provide a first pulse having a first duration;
  a controller configured to provide a second pulse having a second duration, wherein the second duration is shorter than the first duration;
  a comparator configured to obtain said first and second pulses and responsively provide a third pulse to an electronic control module of the vehicle, wherein the third pulse has a third duration that is a (i) function of said second and third durations and (ii) shorter than the first duration.

31. The system of claim 30, wherein said comparator device is an AND gate.

32. A system for limiting performance of a vehicle, said system comprising:
  a command device (i) located remotely from said vehicle and (ii) configured to send a control signal via a wireless communication network;
  a receiving device (i) located aboard said vehicle and (ii) configured to receive said control signal;
  a resistive throttle position sensor, and
  a controller configured to adjust said throttle position sensor signal by causing a reference voltage supplied to said throttle position sensor to be reduced such that said output of said throttle position sensor is reduced.

33. A method for limiting a performance characteristic of a vehicle, comprising the steps:
  receiving via a wireless communication network a vehicle limitation control signal; and
  responsive to said vehicle limitation control signal, limiting the vehicle to a speed below a maximum speed by providing a limiting reference voltage to a throttle position sensor, wherein said limiting reference voltage is less than a primary reference voltage, and wherein said primary reference voltage is operable to allow said throttle position sensor attain said maximum speed.

* * * * *